United States Patent [19]

Brittain et al.

[11] 4,160,375

[45] Jul. 10, 1979

[54] INDICATOR COMPOSITIONS

[75] Inventors: Philip I. Brittain, Bray; Michael R. J. Lyons, Iver, both of England

[73] Assignee: Brent Chemicals International Limited, Iver, England

[21] Appl. No.: 886,325

[22] Filed: Mar. 13, 1978

[30] Foreign Application Priority Data

Mar. 17, 1977 [GB] United Kingdom ............... 11285/77

[51] Int. Cl.² ..................... C09K 11/06; G01N 19/08; G01N 21/16
[52] U.S. Cl. .................................. 73/104; 252/301.19; 252/408
[58] Field of Search ........................... 252/408, 301.19; 73/104

[56] References Cited

U.S. PATENT DOCUMENTS

| | | | |
|---|---|---|---|
| 2,953,530 | 9/1960 | Switzer | 252/301.19 |
| 3,647,705 | 3/1972 | Mlot-Fijalkowski | 252/301.19 |
| 3,896,664 | 7/1975 | Alburger | 73/104 |
| 3,915,885 | 10/1975 | Molina | 252/408 |
| 3,915,886 | 10/1975 | Molina | 252/408 |
| 3,981,185 | 9/1976 | Molina | 252/408 |

*Primary Examiner*—Benjamin R. Padgett
*Assistant Examiner*—T. S. Gron
*Attorney, Agent, or Firm*—Lawrence Rosen; E. Janet Berry

[57] ABSTRACT

A water washable, wash resistant biodegradable dye penetrant composition is described. It comprises one or more dyes and at least 70% of a substantially linear primary alcohol ethoxylate containing 2 to 4.5 ethoxy groups per molecule.

12 Claims, No Drawings

INDICATOR COMPOSITIONS

Known methods of visually locating surface flaws or cracks in test bodies or parts include the application of a dye penetrant composition to the surface, removing excess composition but leaving composition in the flaws or cracks, optionally applying a developer composition to draw penetrant in the flaws or cracks up to the surface, and inspecting the surface. The dye is chosen so that with appropriate lighting those areas where penetrant composition was trapped in flaws or cracks are made readily visible or detectable.

The removal of excess composition is normally conducted by washing, and this washing has to be conducted carefully since if there is inadequate washing composition containing dye remains on the surface even where there are no flaws or cracks whilst if there is too much washing penetrant composition may be removed from the flaws or cracks.

Traditional penetrant compositions comprise dyes and surfactants dissolved in solvents or carriers. More recently compositions have been proposed which contain little or no solvent and which are more tolerant to variations in the duration or vigour of washing. These compositions gel significantly upon contact with a small amount of water but then are removed by washing upon contact with larger amounts of water. Thus once washing starts the composition begins to gel so that the composition on the surface is removed whilst the composition in the cracks and flaws tends to remain. Such compositions can conveniently be called water washable, wash resistant dye penetrant compositions.

An early disclosure of such compositions is in U.S. Pat. No. 3,429,826. This proposed certain mixtures of surfactants and mentioned ethoxylated alcohols as suitable surfactants. Many mixtures were exemplified but in fact none of them contained ethoxylated alcohols. A large number of Patent Specifications have subsequently been published on such water washable wash resistant dye penetrant compositions and recently some specifications have been published proposing the use of alkoxylated alcohols as some or all of the surfactant. For instance in U.S. Pat. No. 3,915,885 it is proposed to use linear primary aliphatic alcohols having from 10 to 18 carbon atoms alkoxylated with mixed ethylene oxide and propylene oxide groups. It is stated to be preferred to have from 4 to 14 alkoxy groups per molecule.

In U.S. Pat. No. 3,915,886 and in several other U.S. Patent Specifications it is proposed to use ethoxylated secondary alcohols, a preferred material that is described having 5 ethylene oxide groups per molecule. Since the use of any such compositions tends to result in a large volume of aqueous effluent it is very desirable that the surfactant should be readily biodegradable.

Whilst compositions according to the prior art can be made which have moderately satisfactory properties both as regards biodegradability and gellability and washability there is room for improvement in all these and, in particular, the known compositions all tend to suffer from the disadvantage that they are based on materials which are not readily available in some countries at least.

According to the invention biodegradable, water washable, wash resistant dye penetrant compositions comprise one or more dyes and at least 70% by weight of primary alcohol ethoxylate component having the formula $RO(CH_2CH_2O)_mH$ wherein R is a saturated substituted substantially straight chain aliphatic group of 8 to 18, preferably 9 to 15, carbon atoms and m is 2 to 4.5. It is easily possible to make compositions within this definition that have exceedingly good biodegradability, washability and gellability properties. Preferably more than 50% of the composition is made up of a primary alcohol ethoxylate in which m 2 to 4, preferably 2.5 to 3.5, eg about 3 and R contains not more than 13 carbon atoms. Most preferably more than 55% of the composition has m 2.8 to 3 and R contains 9 to 11 carbon atoms. It is sometimes preferred to formulate a composition of which 5 to 25%, most preferably 10 to 20%, has m of about 2 and R contains more than 11 carbon atoms.

In the preferred primary alcohol ethoxylates R is substantially linear and represents $CH_3(CH_2)_nCH_2$ wherein n is 7 to 13. If there is any chain branching in the primary alcohol ethoxylate used in the invention it is preferably only very small, for example 1 or at the most 2 side chain methyl groups. Preferably the ethoxylates are wholly linear.

The compositions of the invention gel when first contacted with water but contact with larger amounts results in their being washed away, so that it is easily possible to control the amount of water so that only composition trapped within flaws remains. The compositions may contain solvents or carriers but these are generally introduced for reasons of economy and must be used in amounts insufficient to impair substantially the water resistant and water washable properties of the composition. Thus at the most there is up to about 30% solvents or carriers and preferably there is less, and most preferably no solvents or carriers. Generally the compositions comprise at least 80% surfactants and preferably at least 95% surfactants.

The composition may contain minor amounts, for example less than 10% and usually less than 5%, of one or more minor additives such as corrosion inhibitors, wetting agents, anti-foamants, defoamers, biocides and biostats. Sarkosyl O supplied by Ciba-Geigy Ltd is an example of such a corrosion inhibitor. Preferably the compositions consist solely of one or more of these together with dyes and surfactants. The amount of dye is preferably from 0.05 to 20%, most preferably from 0.1 to 10%.

Preferably the compositions consist of at least 80% of primary alcohol ethoxylate component, 0.1 to 10% dye and 0 to 10% of one of the quoted additives.

In order to obtain optimum wash resistance and washability it is often convenient for the primary alcohol ethoxylate component to be made up of a mixture of two or more different primary alcohol ethoxylates. Preferred mixtures contain 1 part by weight of a primary alcohol ethoxylate wherein m represents 2 and R contains 12 to 15 carbon atoms and from 3 to 8 parts by weight of a primary alcohol ethoxylate wherein m represents substantially 3 and R contains 8 to 13 carbon atoms, most preferably from 5 to 7 parts by weight of a primary alcohol ethoxylate wherein m represents about 3 and R contains 9 to 11 carbon atoms.

In commercially available materials R generally contains a spread of carbon atoms. For instance commercially available materials may have values of R ranging between 9 and 11, and such are suitable for use in the invention.

Although preferably the entire surfactant is made up of the defined primary alcohol ethoxylate component additional surfactant can be added, such as secondary linear alcohol ethoxylates, primary aliphatic amine ethoxylates and alkylphenol ethoxylates.

The dyes used are preferably dues which fluoresce in "black" light, for example, Calcofluor OR Yellow, Azosol Brilliant Yellow 6 GB. Alternatively dyes may be used which fluoresce in "black" light and also exhibit a marked non-fluorescent colour in day light, for example Rhodamine B550, or non-fluorescent dyes may be used, eg Oil Red "O". Mixtures of dyes may also be used.

After the dye penetrant composition has been applied and allowed to remain on the surface in the usual way for sufficient time to penetrate the flaws, the article may be washed with water and then examined but if desired a developer composition, for example a dry powder or a solvent or water based developer may be used before examination. Washing may be by, for instance, immersion in water accompanied by mechanical or air agitation of the water blasting the water against the surface under pressure, optionally with air, or drainage of water from a hose pipe across the surface.

The compositions of the invention may be made merely by mixing the ingredients together. Preferably the dyes are first dissolved in the surfactants with appropriate warming and stirring and then any minor ingredients such as corrosion inhibitors and/or biocides are blended into the mixture.

The following are examples of compositions of the invention. In each the percentages are by weight.

|  | EX- AMPLE 1 | EX- AMPLE 2 |
| --- | --- | --- |
| Linear primary alcohol ethoxylate A | 38.48 | 98.7 |
| Linear primary alcohol ethoxylate B | 57.72 | 0 |
| Calcofluor OR Yellow | 0.30 | 1.10 |
| Sarkosyl "O" | 0 | 0.20 |
| Amino "O" | 3.50 | 0 |

Ethoxylate A has m=4.5 and R contains 12 to 15 carbon atoms. A suitable material is Ethylan D254, supplied by Lankro Chemicals. Ethoxylate B has m=2.9 and R contains 9 to 11 carbon atoms. A suitable material is Ethylan CD913, also from Lankro Chemicals. Amino O is a substituted imidazoline supplied by Ciba-Geigy wherein the ring carbon between the ring nitrogens is substituted by an unsaturated 17 carbon chain and one of the ring nitrogens is substituted by hydroxyethyl.

The compositions may be made by dissolving the yellow dye in the surfactant component with warming and then the corrosion inhibitor may be added. The compositions may be applied to the surface to be tested in conventional manner and rinsed off and the surface then examined. Both gave satisfactory results, Example 1 being particularly satisfactory.

We claim:

1. A method of detecting flaws in the surface of an object which comprises applying to the surface a water washable, wash resistant biodegradable dye penetrant composition comprising one or more dyes and at least 70% by weight of a primary alcohol ethoxylate component, the said component consisting essentially only of one or more compounds of formula $RO(CH_2CH_2O)_mH$ wherein R is the hydrocarbon residue of a substantially straight chain saturated aliphatic alcohol of 8 to 18 carbon atoms and m is 2 to 4 and wherein at least 50% of the composition is provided by introducing into the composition one or more compounds of said formula, the introduced compounds together having a value of m of 2.5 to 3.5 and R in each compound contains 9 to 13 carbon atoms, washing the surface and thereby gelling the composition in the flaws, and observing the gelled composition.

2. A method according to claim 1 in which at least 55% of the composition is provided by introducing into the composition one or more compounds of the said formula and wherein these introduced compounds together have a value of m of 2.8 to 3 and R in each compound contains 9 to 11 carbon atoms.

3. A method according to claim 2 in which from 5 to 25% by weight of the composition is made up of an ethoxylated compound in which m is about 2 and R contains 11 to 15 carbon atoms.

4. A method according to claim 1 in which the primary alcohol ethoxylate component is a mixture of two or more different primary alcohol ethoxylates.

5. A method according to claim 1 in which R in the said formula is $CH_3(CH_2)_nCH_2$ and n is 7 to 13.

6. A method according to claim 1 in which the composition consists essentially only of at least 80% of the said primary alcohol ethoxylate component, 0.1 to 10% dye and 0 to 10% of an additive selected from solvents, corrosion inhibitors, wetting agents, anti-foamants, defoamers, biocides and biostats.

7. A water washable wash resistant biodegradable dye penetrant composition comprising one or more dyes and at least 70% by weight of a primary alcohol ethoxylate component, the said component consisting essentially only of one or more compounds of formula $RO(CH_2CH_2O)_mH$ where R is the hydrocarbon residue of a substantially straight chain saturated aliphatic alcohol of 8 to 18 carbon atoms and m is 2 to 4 and wherein at least 50% of the composition comprises one or more compounds of said formula where m is 2.5 to 3.5 and R contains 9 to 13 carbon atoms.

8. A composition according to claim 7 consisting of at least 80% of the primary alcohol ethoxylate component, 0.1 to 10% dye and 0 to 10% of an additive selected from solvents, corrosion inhibitors, wetting agents, anti-foamants, defoamers, biocides and biostats.

9. A composition according to claim 7 in which m is 2.5 to 3.5.

10. A composition according to claim 7 in which at least 55% of the composition is a primary alcohol ethoxylate in which m is 2.8 to 3 and R contains 9 to 11 carbon atoms.

11. A composition according to claim 7 in which the primary alcohol ethoxylate component is a mixture of two or more different primary alcohol ethoxylates.

12. A composition according to claim 7 in which the composition contains 5 to 25% of an ethoxylate in which m is about 2 and R contains 11 to 15 carbon atoms.

* * * * *